May 11, 1937.   I. G. BROOKS   2,079,895
SUPPLEMENTAL CATCH MECHANISM FOR LOCKS
Filed Feb. 10, 1933   2 Sheets-Sheet 1
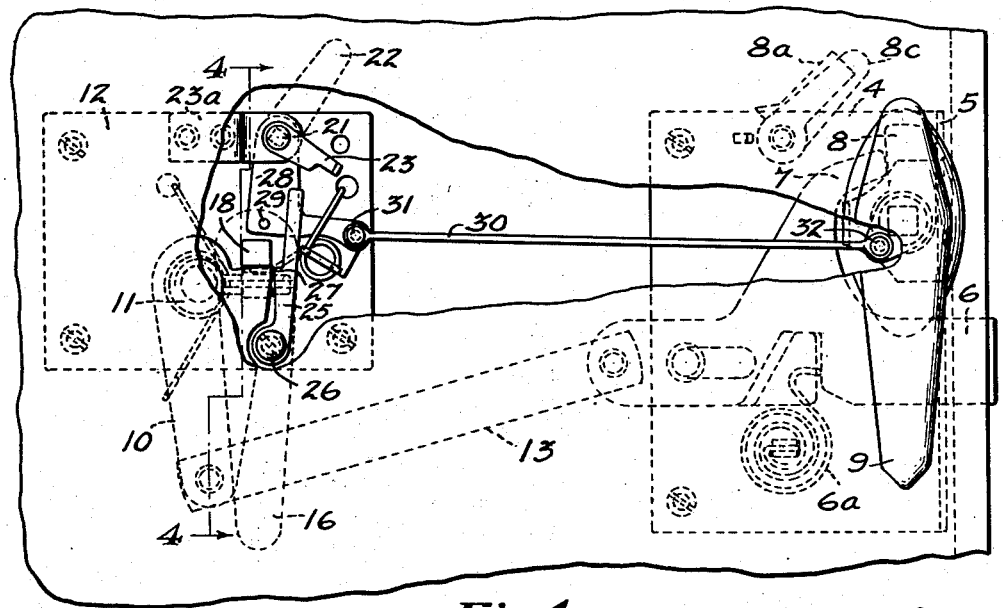
Fig. 1.
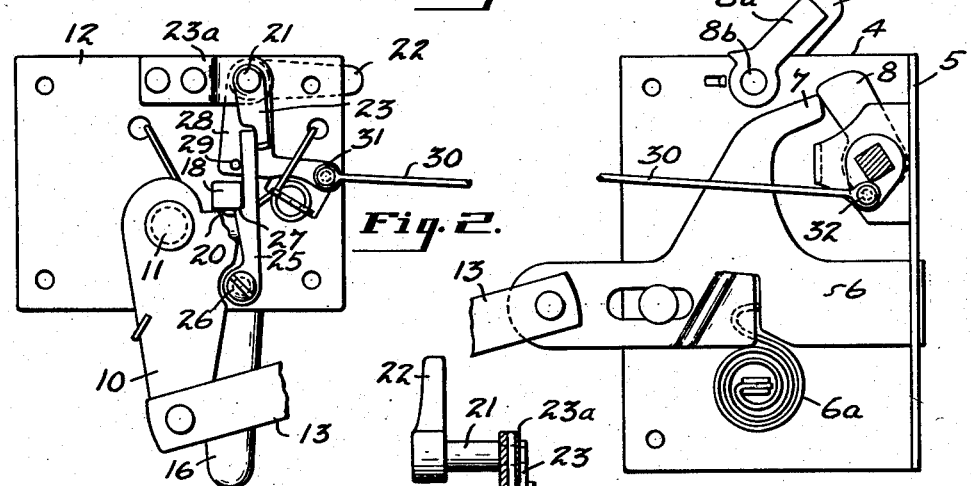
Fig. 2.
Fig. 3.
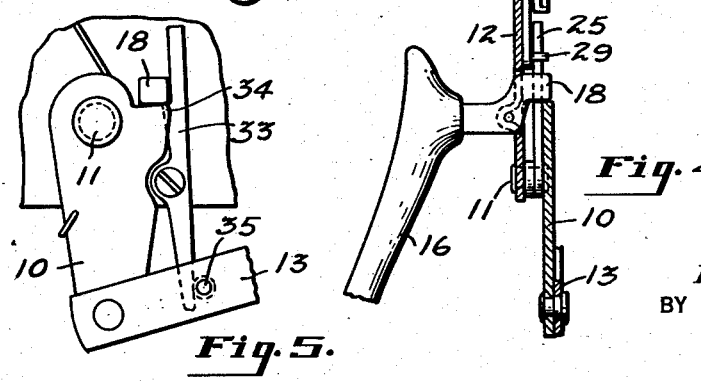
Fig. 5.
Fig. 4.
INVENTOR
Irene G. Brooks
BY
O. L. McCoy
ATTORNEY

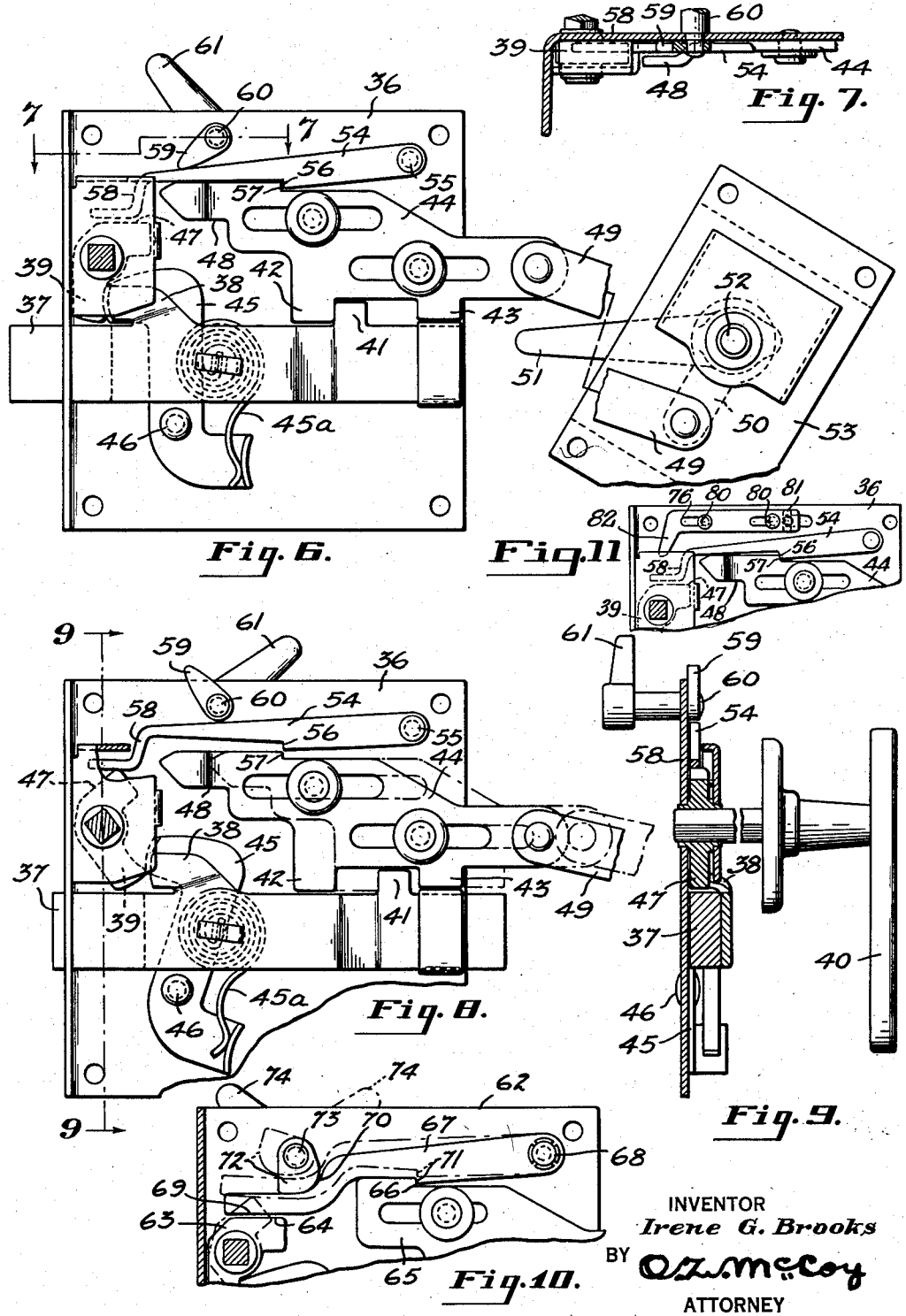

Patented May 11, 1937

2,079,895

UNITED STATES PATENT OFFICE 2,079,895

SUPPLEMENTAL CATCH MECHANISM FOR LOCKS

Irene G. Brooks, Cleveland, Ohio

Application February 10, 1933, Serial No. 656,107

18 Claims. (Cl. 292—164)

This invention relates to locking devices of the general type used on automobile doors and more particularly to a supplemental catch mechanism adapted to be used with different types of conventional locks for preventing the release of the latch bolt of such locks from the same side of the door from which the catch mechanism is actuated to its locking position, and contains the inventive subject matter on which my co-pending application Serial No. 613,798, filed May 27, 1932 is based.

Conventional vehicle door locks, such as those used on automobile doors, which have been manufactured heretofore, have been provided with supplemental latch mechanisms that are operated from the inside of the automobile to secure the lock against operation from the outside and which are also releasable from the inside of the automobile compartment.

Many serious accidents, particularly to children, have resulted from the accidental opening, from the inside, of an automobile door provided with the conventional types of lock. With increasing air travel similar accidents may be expected to occur to adults unless suitable provision is made for their prevention.

The present invention contemplates a supplemental catch mechanism that may be used with different types of door locks, such, for instance, as those used on automobile doors, airplane doors and the like. The catch mechanism forming the subject matter of this invention, serves to lock the door from the inside of the vehicle so that it cannot be subsequently opened from the same side of the door, but which may be opened from the opposite side of the door. In other words, after the catch mechanism is actuated to its locking position from the inside of the vehicle, it can only be released from the outside of the vehicle.

One object of the present invention is to provide a supplemental catch mechanism for a door lock which may be actuated to secured position from one side of the door and which positively prevents the release of the door lock from the same side of the door from which it is placed in secured position.

Another object is to provide a supplemental catch mechanism adapted for use with modern vehicle locks such as those used on automobiles, airplanes and the like, to prevent the accidental opening of a door of the vehicle from the inside after the door is locked from the inside.

A further object of the invention is to provide a supplemental catch mechanism for locks which will not interfere with the closing of the door after the catch mechanism is placed in secured position nor prevent the opening of the door from the outside.

Another object is to provide a mechanical addition to automobile door locks which may be placed in secured position by parents to prevent the accidental or intentional operation of the door lock by children placed within the automobile.

Another object is to provide a supplemental catch mechanism designed to form an addition to the operative mechanism of various forms of conventional commercial locks without objectionable change in the form or usual operation of the parts thereof.

A further object is to provide an addition to commercial forms of vehicle door locks which imparts to such locks the new and important functional advantage of preventing disastrous accidents by the accidental or intentional release of the lock and the unexpected opening of the vehicle door at an inopportune time.

Another object is to provide a single supplemental safety catch mechanism adapted both to prevent ingress into a vehicle compartment from outside the vehicle and to prevent the accidental opening at an undesirable time of a door of the vehicle.

Another object is to provide a supplemental catch mechanism for locks which is simple and durable in construction, reliable and efficient in operation and inexpensive of manufacture.

With the above and other objects in view which will be apparent from the following detailed description, the present invention may be said to consist in certain features of construction and combinations of parts which will be readily understood by those skilled in the art to which the invention appertains.

The invention may be embodied in many different characters of door locks and the following description is intended to show illustrative applications of the principles of the invention as applied to typical door lock mechanisms in order to teach the application of the invention to other forms of lock mechanisms.

In the drawings, which illustrate typical embodiments of the invention,

Fig. 1 is a side elevational view, taken from outside a vehicle door, showing a complete door locking mechanism equipped with one form of supplemental catch mechanism in released position with members 13 and 30 shortened;

Fig. 2 is a side elevational view of the inside portion of the door locking mechanism shown in Fig. 1 with a portion broken away;

Fig. 3 is a side elevational view of the door casement portion of the door locking mechanism shown in Fig. 1;

Fig. 4 is a view, showing partly in section, taken along the line 4—4 of Fig. 1;

Fig. 5 is a side elevational view of a modification of a lever member of the supplemental catch mechanism;

Fig. 6 is a side elevational, laterally foreshortened view of a further modification of the supplemental catch mechanism shown in engaged position, as applied to another common form of lock;

Fig. 7 is a sectional view, taken along the line 7—7 of Fig. 6;

Fig. 8 is a side elevational view of the door casement portion of the form of supplemental catch mechanism shown in Fig. 6;

Fig. 9 is a sectional view, taken along the line 9—9 of Fig. 8;

Fig. 10 is a side elevational view of a further modification of the supplemental catch mechanism adapted to both prevent ingress from outside the vehicle and to prevent the accidental opening at an inopportune time of the vehicle door; and Fig. 11 is a side elevation of the portion of the lock that is shown in Figs. 6–10, inclusive, with a modified form of locking member operating means.

The preferred form of conventional door lock mechanism with which the supplemental catch mechanism forming the subject matter of the present invention may be used, is shown in Figs. 1–5, inclusive of the accompanying drawings.

The casement portion of the vehicle door lock there shown, as viewed from the outside of the vehicle and looking thru the door, comprises a case plate 4 that has an upturned casement flange 5 at one end that is provided with a suitable aperture for the accommodation of a reciprocating spring operated latch bolt 6. The slide plate shank portion of the latch bolt 6 is provided with a spring 6a for maintaining the bolt 6 in advanced position and with a finger 7 that engages a roll back 8 that is rigidly mounted on the shaft of an outside operating handle 9.

Upon operation of the outside handle 9, the latch bolt 6 may be retracted against the pressure of the spring 6a. The outside handle 9 may be equipped with a usual form of locking mechanism, not shown, such as a key, for locking the door from the outside of the vehicle if such is desired. A dog 8a, of conventional construction, is rigidly mounted on one end of a shaft 8b that is journaled in the case plate 4 and is operated by a handle 8c that is accessible from inside the vehicle compartment. This is a conventional form of lock for preventing the rotation of the roll back 8 by the outside handle 9, when in the locked position by causing the engagement of the roll back 8 with the unattached end of the dog 8a on the partial rotation of the dog handle 8c.

An inside operating mechanism of the lock is remotely mounted with respect to the above described casement portion of the lock and comprises a crank arm 10 pivotally mounted on the shaft 11 that is journaled in the case plate 12. The lower end of the crank arm 10 is pivotally connected thru the link rod 13 to an end of the slide plate shank portion of the latch bolt 6.

An inside operating handle 16 is pivotally mounted on one side of the plate 12 and it has an extension 18 positioned within a slot formed in the plate 12. The extension 18 is adapted to engage a shoulder 20 formed at one side of the upper end of the crank arm 10.

The operation of the latch bolt 6 from inside the vehicle to open the door is accomplished by the operation of the inside handle 16 which causes the extension 18 to rock the crank arm 10, thereby pulling the rod 13 back and retracting the latch bolt 6 against the yielding pressure of the spring 6a.

Referring more particularly to the supplemental catch mechanism forming the subject matter of this invention, a suitable operating means for the catch mechanism comprises a shaft 21 that is journaled in the plate 12 above the operating handle 16 and that carries a handle 22 on one end for turning the shaft 21 and that also carries a depending arm 23 on the other end. The arm 23 serves as a means for operating a suitable device for securing the inside handle 16 against motion from the inside of the vehicle compartment, when desired. Any suitable means, such as the flat leaf spring 23a, may be provided for maintaining these parts in freely operative relation with each other and for preventing rattling while the vehicle upon which the lock is mounted is in motion.

A movable shouldered member, such as the locking lever 25, having a portion available for engagement with a portion of a latch bolt operating means, such as the extension 18 described above, is provided for locking the inside handle 16 against motion. The locking lever 25, having its lower end pivotally mounted on a headed pin 26 that is carried by the plate 12, may be operated by the free end of the depending arm 23 as shown.

The upper end of the locking lever 25 preferably extends beyond the side of the extension 18 of the inside handle 16, particularly as shown in Fig. 4, and is movable toward and away from the extension 18. The side of the locking lever 25 adjacent to the extension 18 is provided with a laterally projecting shoulder portion 27 that is adapted to engage the lower face of the squared extension 18 when the locking lever 25 is moved toward the extension 18, as shown in engaged position in Fig. 2. In this position the shoulder 27 of the locking member 25 prevents movement of the inside handle 16. The locking lever 25 may be released from its engaged position by operation of the outside handle 9 of the vehicle door but not by operation of either the handle 22 or of the inside handle 16. The release of the locking member 25 is also independent of either the handle 16 or the handle 22.

Suitable means, such as a swinging plate 28, suspended from the shaft 21 between the arm 23 and the plate 12, is provided for releasing the engagement of the shoulder 27 of the locking lever 25 with the extension 18 of the handle 16 upon operation of the outside handle 9. The lower end of the swinging plate 28 is preferably positioned to extend below the end of the arm 23 and to carry a pin 29 that projects from its surface to engage the upper end of the locking lever 25 when the plate 28 is caused to swing in a forwardly direction by the pull on the rod 30. The plate 28 is actuated by the rod 30 which has one end pivotally connected to the plate 28 by the pin 31 and has its opposite end eccentrically pivoted to the bearing of the roll back 8 by the pin 32. Rotation of the roll back 8, by the turning of the outside handle 9, causes the plate 28 to swing sufficiently to bring the pin 29 into engagement with the locking lever 25 to release the locking lever 25 from engagement with the extension 18 and at the same time to cause the locking lever 25 to move the arm 23 sufficiently to return the handle 22 of the locking mechanism to its original position.

The locking operation of the supplemental catch mechanism is performed by the turning of the handle 22 from the inside compartment of the vehicle. As the handle 22 is turned the unattached arm 23 swings downward against the upper end of the locking lever 25 which is moved towards the extension 18 of the inside handle 16 sufficiently to position the projection 27 of the locking lever 25 beneath the extension 18 thereby locking the inside handle 16 against operation without in any way interfering with the closing of the door from the outside. Subsequent operation of the handle 22 in either direction cannot then release the locking lever 25 or otherwise function to permit the operation of the inside handle 16 to open the vehicle door.

The supplemental catch mechanism may be released at any time by operation of the outside handle 9 of the door altho it can not be released from the inside of the vehicle. The operation of the outside handle 9 causes movement of the pin 32 which actuates the rod 30. The swinging plate 28 is thereby partially rotated about the shaft 21 as a center. The engagement of the pin 29, carried by the swinging plate 28, with the locking lever 25 effects the withdrawal of the shoulder 27 from beneath the extension 18 of the handle to thus release the inside handle 16. The depending arm 23 and the handle 22 are also moved to their original released positions by the engagement of the free end of the arm 23 by the upper end of the locking lever 25, to place the arm 23 in inoperative position.

A modified form of means for operating a locking lever 33, which is similar in operation to the locking lever 25, is shown in Fig. 5. This construction permits the omission of the plate 28 and the rod 30 described above. The locking lever 33 has a shoulder 34 and upper portion substantially identical with the locking lever 25 previously described but which terminates downwardly in an extended lower portion of sufficient length to engage a pin 35 that is carried by the rod 13. The engagement of the pin 35 with the lower extremity of the locking lever 33 upon operation of the rod 13, serves to disengage the shoulder 34 of the locking lever 33 from beneath the extension 18 of the inside handle 16.

A modified form of supplemental catch mechanism, as applied to another common type of vehicle lock, is shown in Figs. 6–9 inclusive of the drawings.

The casement portion of this type of vehicle lock includes a case plate 36 that carries a latch bolt 37 that is provided with a finger portion 38 which forms a part of its slide plate shank portion. The end of the finger portion 38 is adapted to engage a roll back 39 that is operated by an outside handle 40. A lug 41, that also forms a part of the slide plate shank portion of the latch bolt 37, is positioned to fit between a pair of lugs 42 and 43 that form part of a slide plate 44 that is also carried by the case plate 36. A spring pressed lever member 45, that is positioned between the slide plate shank portion of the latch bolt 37 and the case plate 36, is pivoted on the pin 46 so that it bears against a portion of the roll back 39 under the yielding pressure of the spring 45a. A flat or land portion 47, that forms the flat upper surface of the roll back 39, makes sliding engagement with a flat or land portion 48 of the slide plate 44 to prevent rotation of the roll back 39 when the slide plate 44 is in advanced position.

The inside operating portion of this type of vehicle lock is connected to the casement portion thereof by a rod 49 that is secured at one end to the slide plate 44 and at the other end to one end of the lever 50 that forms part of a latch operating mechanism positioned on the inner face of a door and that is accessible from the inside compartment of the vehicle. The lever 50 is operated by an inside handle 51, both of which are rigidly secured to opposite ends of the shaft 52 that is journaled thru a case plate 53.

The modified form of supplemental catch mechanism, as applied to this type of lock, includes a locking member 54, preferably of lever type, that is pivotally mounted on the plate 36, as by the headed bolt 55, and that has a shoulder 56 positioned to engage a shoulder 57 formed on the upper side of the slide plate 44. The locking member 54 also has a vertically offset portion 58 at its free end. The end of the slide plate 44 upon which the flat or land area 48 is formed, is offset laterally sufficiently to avoid contact with the vertically offset portion 58 of the locking member 54.

The locking member 54 is preferably placed in locking position by a depending arm 59, or other suitable means, that is rigidly secured to one end of a shaft 60 that is journaled in the case plate 36. In locking position the shoulder 56 of the locking member 54 abuts the shoulder 57 of the slide plate 44. A handle 61, that is rigidly mounted upon the opposite end of the shaft 60 and that is accessible from the inside compartment of the vehicle, serves to operate the depending arm 59.

The operation of this form of supplemental catch mechanism is accomplished from inside the vehicle compartment as in the previously described forms of supplemental catch mechanism.

The supplemental catch mechanism may be placed in secured position by the operation of the handle 61 which causes the depending arm 59 to depress the locking member 54 sufficiently to effect the engagement of the shoulder 56 of the locking member 54 with the shoulder 57 of the slide plate 44 and to cause the engagement of the vertically offset portion 58 of the locking member 54 with the flat or land portion 47 of the roll back 39. The placing of the supplemental catch mechanism in locking position in no way interferes with the closing of the vehicle door.

The release of the locking member 54 cannot then be accomplished by additional operation of the handle 61. The operation of the inside handle 51 is prevented from causing the retraction of the latch bolt 37 by the shoulder 56 of the locking member 54, which engages the shoulder 57 of the slide plate 44 and limits the motion of the slide plate 44 so that the lug 42 cannot move the slide plate shank portion of the latch bolt 37 by its usual engagement with the lug 41.

The release of the supplemental catch mechanism from secured position may be accomplished by the operation of the outside handle 40. Upon moving the outside handle 40, the roll back 39 is caused to rotate and the flat or land portion 47, forming a part thereof, frictionally engages the vertically offset portion 58 of the locking member 54 and causes the elevation of the locking member 54 and the disengagement of the shoulder 56 from the shoulder 57. The depending arm 59 and the handle 61 are by the same operation caused to assume their original positions by the engagement of the locking member 54 with the depending arm 59, to place said arm 59 in its inoperative position.

A further modification of the supplemental catch mechanism that is particularly adapted for use on the doors of the rear compartment of an automobile is shown in Fig. 10.

This form of supplemental catch mechanism has the operative function of the present invention, and it also operates to prevent the opening of the vehicle door from the outside when the latch handle 74 is in the position shown in full lines in Fig. 10, thereby replacing the dog 8a, shown in Figs. 1 and 3 of the accompanying drawings.

An illustrative installation of this form of supplemental catch mechanism is shown in Fig. 10, as applied to the type of lock shown in Fig. 6, with the lower part omitted. The portion of the lock shown includes a case plate 62 that carries a roll back 63 that has a flat or land portion 64 forming its upper surface. The slide plate 65, that is similar to the slide plate 44 in Fig. 6 with the portion 48 removed, has a shoulder 66 forming a part thereof.

This modification of the supplemental catch mechanism includes a rugged and strong locking lever 67 that is pivotally mounted on the case plate 62 by the friction pivot 68 that somewhat restricts its freedom of rotation. The locking lever 67 has a flat or land portion 69 at its unattached end that is positioned to engage the flat or land portion 64 of the roll back 63. The locking lever 67 also has a curved portion 70 that is preferably positioned substantially opposite the flat or land portion 69 and that has a shoulder 71 positioned to engage the shoulder 66 of the slide plate 65. A depending dog 72 is rigidly mounted on one end of the shaft 73 that is journaled in the case plate 62 and that carries the handle 74 positioned inside the vehicle compartment at the opposite end of the shaft 73. The unattached end of the dog 72 is preferably of curved shape to substantially conform with the curved portion 70 of the locking lever 67. The remainder of the lock mechanism is identically the same as the structure shown in Figs. 6, 7, 8, and 9.

The supplemental catch mechanism is placed in-position to prevent operation from outside of the vehicle by turning the handle 74 to place the dog 72 in the locking position, as shown in full lines in Fig. 10, wherein the curved portion of the dog 72 is positioned against and allowed to remain against the curved portion 70 of the locking lever 67. The vehicle lock cannot be operated from outside of the vehicle when the dog 72 is left in its locking position, in which position the rotation of the roll back 63 is prevented by the contact of the land portion 69 of the locking lever 67 with the land portion 64 of the roll back 63.

The supplemental catch mechanism is placed in position to prevent operation of the door lock from inside the vehicle compartment by moving the handle 74 to place the dog 72 in its engaged position. If the handle 74 is then moved to its unengaged position, as shown in dot and dash lines in Fig. 10, the door can then be opened from the outside but not from the inside. The locking lever 67 is caused to retain its position due to the resistance of the friction pivot 68 and it effectively prevents the opening of the door from the inside of the vehicle compartment since movement of the slide plate 65 to draw the lock bolt is prevented by the engagement of the shoulders 66 and 71 and since the door cannot be opened by further operation of the handle 74.

With the locking lever 67 in its engaged position, the door may be opened by operation of the outside handle to cause the rotation of the roll back 63 which elevates the free end of the locking lever 67 to the released position shown in dot and dash lines in Fig. 10. In this position the supplemental catch mechanism does not interfere with the opening or the closing of the door.

The supplemental catch mechanism forming the subject matter of the present invention may be applied to any of the conventional forms of door locks such as those used on automobiles, airplanes and the like, without material changes in the construction of the locks and will provide absolute safety to children carried or left within the automobile, or to adults or children in other forms of vehicles, such as airplanes, where the danger of the accidental opening of a door might precipitate an individual out of the vehicle and cause serious injury or death.

The present invention substantially embodies an addition to modern types of locks that acts as a stop upon the latch bolt, the slide plate acting to withdraw the latch bolt, or on a handle for operating the latch bolt, and that may be released by the operation of the usual operative parts of the lock with or without additional parts added thereto.

The reciprocating sliding member 76, is suitably mounted for reciprocating sliding movement on the case plate 36, or on the case plate 62 as by the headed rivets 80, that pass thru elongated slots in the sliding member 76. The sliding member handle 81 extends thru an elongated slot in the case plate on which the sliding member is mounted. The locking member 54, or the locking lever 67, may be placed in locking position by causing their engagement by the sliding member tip 82, on its operation by the use of the sliding member handle 81. As in the previously described constructions, neither of the sliding members 75 or 76, can cause the release of the locking members from locking engagement on the further operation of the respective sliding member handle.

It is to be understood that the particular embodiments of the invention shown and described are shown for purposes of illustration and explanation and that various modifications in the construction and uses shown and described may be made without departing from the invention as defined in the appended claims.

What I claim is:

1. In a locking device, the combination with a vehicle door latch having outside and inside operating mechanism, of means operated independently of an inside handle that forms a part of said inside operating mechanism and accessible only from the inside for locking the inside operating mechanism against operation from the inside and said inside handle being free to operate consecutively to open a door when said independent locking means is not in engaged position, and means actuated by the outside latch operating mechanism for releasing said locking means.

2. In a locking device, the combination with a vehicle door latch having outside and inside operating mechanism, the inside operating mechanism including a handle for consecutively operating the same, of a locking lever engageable with the handle of the inside operating mechanism for securing the handle against operation, means operated independently of said inside handle and accessible only from the inside for actuating said locking lever to its locking position, and means responsive only to the operation of said outside operating mechanism for releasing the locking lever actuating it to its unlocked position.

3. In a locking device, the combination with a vehicle door latch having outside and inside operating mechanism, the inside operating mechanism including a crank arm operatively connected to a latch bolt and a handle for operating the crank arm, of a pivoted locking lever engageable with the handle of the inside operating mechanism to secure the same against operation, a shaft, a handle for turning said shaft, an arm depending from said shaft and engageable with said locking lever to move said lever into locking position upon rotation of said shaft but incapable of releasing the locking lever, and means actuated solely from the outside of the door for releasing said locking lever.

4. In a locking device, the combination with a vehicle door latch having outside and inside operating mechanism, the inside operating mechanism including a crank arm operatively connected to a latch bolt and a handle for operating the crank arm, of a pivoted locking lever engageable with the handle of the inside operating mechanism to secure the same against operation, a shaft, a handle for turning said shaft, an arm depending from said shaft, engageable with said locking lever to move said lever into locking position upon rotation of said shaft, and means operatively connected with the outside latch operating mechanism for releasing said locking lever.

5. In a locking device, the combination with a vehicle door latch having outside and inside operating mechanism, the inside operating mechanism including a crank arm operatively connected to a latch bolt and a handle for operating the crank arm, of a pivoted locking lever engageable with the handle of the inside operating mechanism to secure the same against operation, a shaft, a handle for turning said shaft, an arm depending from said shaft, engageable with said locking lever to move said lever into locking position upon rotation of said shaft, a swinging plate suspended from said shaft, means carried by said plate engageable with said locking lever to release the same, and means operatively connecting said plate with the outside latch operating mechanism whereby said locking lever will be released upon actuation of the outside operating mechanism.

6. The combination with a door having a latch bolt and means on each side of the door for independently withdrawing said latch bolt, of interlocking means operated to interlocking position from one side only of the door for preventing operation of the latch bolt withdrawing means from that side of the door and operable independently of the latch bolt withdrawing means on one side of the door, and means controlled solely from the other side of the door for releasing said interlocking means to permit normal operation of said latch bolt from either side of the door.

7. The combination with a door having a latch bolt, means operable from the outside of the door for withdrawing the latch bolt, and means consecutively operable from the inside of the door for withdrawing said latch bolt, of means operable independently of said inside latch bolt withdrawing means and operable from the inside of the door for interlocking with the bolt withdrawing means to prevent withdrawal of said latch bolt from the inside of the door, and means actuated by the means operable from the outside of the door for releasing said interlocking means.

8. In a locking device, the combination with a vehicle door latch having outside and inside consecutively operating mechanism, of a locking member for securing the inside operating mechanism against operation and operable independently of said inside operating mechanism, and means operatively connected with the outside latch operating mechanism for releasing said locking member.

9. In a locking device, the combination with a vehicle door latch having outside and inside operating mechanism, of a locking member for securing the inside operating mechanism against operation, a swinging member engageable with said locking member to release the same, and means operatively connecting said swinging member with the outside latch operating mechanism.

10. In a locking device, the combination with a vehicle door latch having outside and inside operating mechanism, of a pivoted locking member for securing the inside operating mechanism against operation, a pivoted arm operable to move said locking member into locking position, a swinging member operable to move said locking member to released position and means operatively connecting said swinging member with the outside latch operating mechanism.

11. The combination with a door having a latch bolt, means operable from the outside of the door for withdrawing said latch bolt, and means operable from the inside of the door for consecutively withdrawing said latch bolt, of means interlocking in one position to prevent withdrawal of the latch bolt from the inside of the door, means operable independently of said inside latch bolt withdrawing means and operable from the inside of the door for operating said interlocking means to its locking position only, and additional means operable only from the outside of the door for releasing said interlocking means.

12. The combination with a vehicle door having a door lock comprising a latch bolt that is spring pressed in one direction, an outside handle on the door carrying said lock, means operatively connecting said outside handle to said latch bolt for retracting said latch bolt upon operation of said outside handle, an inside handle on said door, and means operatively connecting said inside handle to said latch bolt for retracting said latch bolt upon the consecutive operation of said inside handle, of a securing device designed to interlock with said inside handle for rendering the inside handle inoperative to withdraw said latch bolt when said securing device is in interlocked position, means carried by the door for moving said securing device to its interlocking position, and means independently operable with respect to said inside handle and operated by the outside door handle for releasing said securing device.

13. The combination with an automobile door having a door lock comprising a latch bolt that is spring pressed in one direction, an outside handle on the door carrying said lock, means operatively connecting said outside handle to said latch bolt for retracting said latch bolt upon operation of said outside handle, an inside handle on said door, and means operatively connecting said inside handle to said latch bolt for retracting said latch bolt upon the consecutive operation of said inside handle, of a securing device comprising a pivoted locking member designed to interlock with said inside handle for rendering the inside handle inoperative to withdraw said latch bolt when said pivoted locking member is in interlocked position, and means independently operable with respect to said inside handle and carried by the door for moving said pivoted locking member to its interlocking position, and means operated by the outside door handle for releasing said pivoted locking member.

14. The combination with an automobile door having a door lock comprising a latch bolt that is spring pressed in one direction, an outside handle on the door carrying said lock, means operatively connecting said outside handle to said latch bolt for retracting said latch bolt upon operation of said outside handle, an inside handle on said door, and means operatively connecting said inside handle to said latch bolt for retracting said latch bolt upon operation of said inside handle, of a securing device operable independently of said inside handle and releasably engaging an operative portion of said inside handle for rendering said inside handle inoperative, means for releasing said securing device from engagement with the operative portion of said inside handle, and means operable from said outside handle for releasing said securing device.

15. In a locking device, the combination with a vehicle door latch having outside and inside operating mechanism, of a means engaging a locking member for securing the outside operating mechanism against operation when said means is in engaged position and for securing the inside operating mechanism against operation when said means is in engaged or disengaged position, and means operatively connected with the outside latch operating mechanism for releasing said locking member only when said means is in disengaged position.

16. A locking device for vehicle doors comprising a latch member, means actuated from the outside of the vehicle door for retracting said latch member, means actuated from the inside of the vehicle door for retracting said latch member, an elongated pivoted locking member having opposed arms and a shoulder formed on one arm thereof for engagement with said means for actuating the latch member from the inside to render said means inoperative to actuate said latch member, means on the outside latch retracting means engageable with the other arm of said pivoted locking member for moving said shoulder of the locking member out of engagement with said inside latch operating means, and means operable independently of said inside latch member retracting means and accessible only from the inside of the vehicle door for moving the shoulder of said locking member into engagement with the inside latch operating means but incapable of releasing said shoulder from engagement with said inside latch operating means.

17. In a locking device, the combination with a vehicle door latch having outside and inside operating mechanism, of a locking member for securing the inside operating mechanism against operation, a sliding member engageable with said locking member to place the locking member in locking position, a swinging member engageable with said locking member to release the same, and means operatively connecting said swinging member with the outside latch operating mechanism.

18. In a locking device, the combination with a vehicle door latch having outside and inside operating mechanism, of a pivoted locking member for securing the inside operating mechanism against operation, a sliding member operable to move said locking member into locking position, a releasing member operable to move said locking member to released position, and means operatively connecting said releasing member with the outside latch operating mechanism.

IRENE G. BROOKS.

CERTIFICATE OF CORRECTION.

Patent No. 2,079,895.　　　　　　　　　　　　　　　　　　　　May 11, 1937.

IRENE G. BROOKS.

It is hereby certified that error appears in the printed specification of the above numbered patent requiring correction as follows: Page 4, second column, after line 38, insert the following paragraph:-

The locking members 25, 33, 54 or 67 may be placed in locking position by suitable reciprocating sliding members, if desired, by substituting for the depending arms 59 or the dog 72, with operating handles and shafts, the reciprocating sliding member 76, that is shown in Figure 11, that is adapted to place the locking members 54 or 67 in secured position without alteration in their mechanical operation, as disclosed herein.;

page 5, second column, lines 69-70, claim 12, strike out the words "independently operable with respect to said inside handle and" and insert the same after "means" in line 67, same claim; and that the said Letters Patent should be read with these corrections therein that the same may conform to the record of the case in the Patent Office.

Signed and sealed this 13th day of July, A. D. 1937.

(Seal)　　　　　　　　　　　　　　　　　　　　　　　　　　Henry Van Arsdale
　　　　　　　　　　　　　　　　　　　　　　　　　Acting Commissioner of Patents.